Aug. 29, 1933. C. G. WILSON 1,924,428
OVERHEAD SWIVEL ARM FOR LUBRICANT SUPPLY HOSE
Filed Sept. 2, 1931
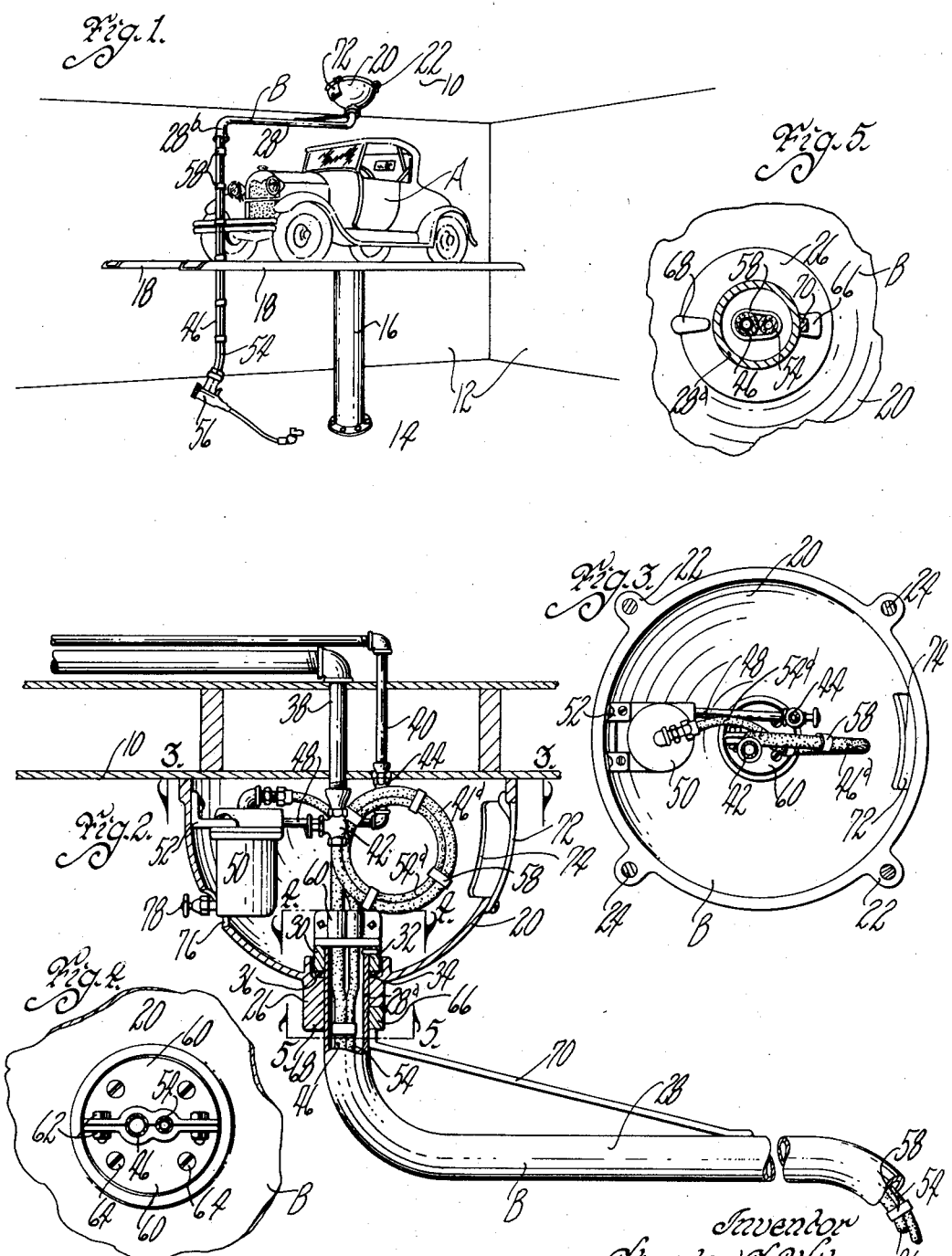

Patented Aug. 29, 1933

1,924,428

UNITED STATES PATENT OFFICE 1,924,428

OVERHEAD SWIVEL ARM FOR LUBRICANT SUPPLY HOSE

Charles G. Wilson, Bryan, Ohio, assignor to The Aro Equipment Corporation, Bryan, Ohio, a corporation of Ohio Application September 2, 1931. Serial No. 560,859

6 Claims. (Cl. 299—86)

An object of my invention is to provide an overhead swivel arm for supporting a lubricant supply hose, the device being comparatively simple and inexpensive and particularly adapted for use in connection with an automobile lift.

A further object is to provide a swivel arm for a lubricant hose comprising a fixture to be secured to a ceiling or the like and a swivelly mounted arm extending laterally therefrom so that when an automobile is positioned substantially centrally under the fixture, a lubricant supply hose depending from the outer end of the swivelly mounted arm may be swung to any desired angular position for supplying lubricant to the bearings of the automobile.

The device may also be used for supplying compressed air to the tires of the automobile or for any other fluid or gas to be supplied to various parts of the vehicle or the like.

Still a further object is to provide a swivelly mounted supporting arm for a lubricant hose or the like consisting of a bowl-like fixture having a vertical hub in which a vertical portion of a laterally extending arm is swivelly mounted and means is provided to limit the swivel movement of the arm relative to the fixture to an arc of less than three-hundred and sixty degrees, whereby the supply hose extending from the ceiling and into the arm is prevented from being twisted and eventually fractured.

Another object is to provide an air strainer inside the fixture and control valves for both the lubricant supply and a compressed air supply hose.

A further object is to provide a collar on the supply hoses which may be clamped thereto by means of clamping bolts, so as to prevent them from being pulled out of the swivel arm.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a perspective view of an overhead swivel arm embodying my invention, showing it located over an automobile lift and a grease gun connected with the depending ends of the supply hoses.

Figure 2 is an enlarged vertical sectional view through the bowl-like fixture which serves as a mounting on the ceiling for the swivel arm.

Figure 3 is a sectional view on the line 3—3 of Figure 2; and

Figures 4 and 5 are sectional views on the lines 4—4 and 5—5 of Figure 2, showing the parts on a larger scale.

On the accompanying drawing, I have used the reference numeral 10 to indicate a ceiling, 12 to indicate walls and 14 to indicate a floor. A hydraulically operated lift plunger is indicated at 16 having vehicle supporting rails 18 thereon. An automobile A is illustrated in supported position on the rails 18. My overhead swivel arm invention is indicated generally by the reference character B and is adapted in particular for use in connection with automobile lifts, although it is obvious that it may be used in connection with an automobile resting on the floor beneath it.

My overhead swivel arm mechanism includes a bowl-like fixture 20 having perforated ears 22 by which it may be secured to the ceiling 10 or other overhead support by lag screws or the like 24. A vertical hub 26 is formed on the lower end of the fixture 20 for swivelly supporting a laterally extending arm 28. The arm 28 has a vertical portion 28a swivelly mounted in the hub 26 and an outer down turned end 28b.

The swivel arm 28 is supported against downward movement of the portion 28a relative to the hub 26 by means of a collar 30 which may be pinned as at 32 to the portion 28a or otherwise suitably secured thereto.

Beneath the collar 30, ball bearings 34 are annularly arranged in an annular socket 36. Thus the socket 36 together with the collar 30 and the ball bearings 34 act as a thrust bearing.

A lubricant supply pipe 38 extends from the ceiling 10 into the fixture 20. A compressed air supply pipe 40 similarly extends into the fixture. Control valves 42 and 44 are provided on the pipes 38 and 40, respectively. A lubricant supply hose 46 is connected with the control valve 42 and has a coiled portion 46a. A pipe 48 connects the air valve 44 with a centrifugal air strainer 50 suitably supported by a bracket 52 within the fixture 20. From the air strainer 50, a compressed air supply pipe 54 extends. It is provided with a coiled portion 54a.

From the coiled portions 46a and 54a, the supply hoses 46 and 54 extend into the vertical portion 28a of the swivel arm 28, then through the arm and depend from the outer end 28b thereof. They are connected with a grease gun 56 or any other desirable type of lubricant supply nozzle. The hoses 46 and 54 are clipped together by means of clips 58 to provide a dual hose.

To prevent the dual hose from being pulled out of the arm 28 I provide a two part clamp collar 60, as best shown in Figures 2 and 4 of the drawing. The two parts of the clamp collar 60 are held together by clamping bolts 62 and may be positively positioned on the collar 30 by means of screws 64 or the like.

To prevent the portions of the hoses 46 and 54 within the fixture 20 from becoming twisted and fractured, I provide a stop lug 66 on the arm 28 and a stop lug 68 on the hub 26. These engage each other to limit the arc of swing of the arm 28 to less than three hundred and sixty degrees. A brace 70 is welded or otherwise secured to the arm 28, as illustrated in Figure 2, to prevent undesired unbending of the bend between the lateral portion of the arm 28 and the vertical portion 28a thereof.

Access may be had to the control valves 42 and 44 through a removable cover plate 72 positioned over an opening 74 in the fixture 20. An opening 76 is provided through which a drain valve 78 projects. The drain valve 78 may be opened for draining moisture and oil from the strainer 50 when desired.

It will be obvious that a device of this type is particularly desirable for use in connection with an automobile lift since it supports the grease gun 56 and the supply hose therefor in a depending position and the gun may be quickly and conveniently swung around the automobile to lubricate the various bearings thereof. It will also be obvious that the device can be operated in connection with an automobile thereunder whether or not it is on a lift.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. An overhead swivel arm for a lubricant supply hose comprising a bowl-like fixture adapted to be secured to a ceiling or the like, a tubular arm having a vertical portion swivelly mounted in said fixture and depending therefrom, a horizontal portion extending laterally from the lower end of said vertical portion and an outer downwardly extending portion, an air strainer within said fixture, said fixture having an opening in the wall thereof, a drain valve on said air strainer and projecting through said opening, a compressed air supply hose extending from said air strainer, a lubricant supply hose and said compressed air supply hose extending into said vertical portion of said arm and from said downwardly extending portion thereof and a lubricant gun connected with the lower ends of said hoses.

2. An overhead swivel arm for lubricant supply hoses comprising a fixture adapted to be secured to a ceiling or the like, a vertical hub thereon, an arm having a vertical end swivelly mounted therein, a central laterally extending portion and a down turned terminal end, an annular socket in the upper end of said hub and around the vertical end of said arm, a collar on said arm and ball bearings beneath said collar and in said socket and a lubricant supply hose extending from said ceiling, loosely through said fixture supported by said arm and extending from said down turned end thereof and means on said hose to engage said vertical hub and thereby prevent downward movement of said hose relative thereto.

3. An overhead swivel arm for lubricant supply hoses comprising a fixture adapted to be secured to a ceiling or the like, a vertical hub thereon, an arm having a vertical end swivelly mounted therein, means for limiting the swivelling movement of said arm to less than a full circle relative to said fixture, a central laterally extending portion and a down turned terminal end, a lubricant supply pipe extending from said ceiling into said fixture and a lubricant supply hose extending from said lubricant supply pipe, coiled in said fixture, supported by said arm and extending from the down turned end thereof.

4. A lubricant hose supporting device comprising a fixture adapted to be secured to a ceiling or the like, a vertical hub thereon, a laterally extending arm having one end swivelly mounted in said hub, means for limiting the swivel movement of said arm relative to said fixture to an arc of less than three hundred and sixty degrees and means for supporting a lubricant supply hose on said arm with the terminal end thereof depending from the outer end of the arm, said last means including an enlargement on said hose to limit downward longitudinal movement of the hose relative to said hub, said hose being coiled within said fixture.

5. An overhead swivel arm for a lubricant supply hose comprising a bowl-like fixture adapted to be secured to a ceiling or the like, a horizontal tubular arm having vertical end swivelly mounted in said fixture and limited to swing in an arc of less than three hundred and sixty degrees, said arm extending laterally from said fixture, a lubricant supply hose extending loosely through said fixture and into said first mentioned end of said arm and depending from the other end thereof, a clamp collar on said lubricant hose and resting on said first mentioned end of said arm and a lubricant discharge nozzle on the lower end of the depending portion of said hose.

6. A lubricant hose supporting device comprising a fixture adapted to be secured to a ceiling or the like, a vertical hub thereon, an arm having a vertical end swivelly mounted in said hub, means to limit the angle of rotation of said arm to less than three hundred and sixty degrees, a laterally extending central portion and a depending outer end, said arm being tubular, a lubricant supply hose extending from said ceiling, loosely through said fixture and then through said arm and depending from the outer end thereof and a clamp collar on said hose above said vertical end of said arm and resting thereon.

CHARLES G. WILSON.